United States Patent [19]  [11]  4,034,859
Moosberg  [45]  July 12, 1977

[54] CENTRIFUGAL BRAKE MECHANISM

[75] Inventor: Börje Sigurd Moosberg, Morrum, Sweden

[73] Assignee: ABU Aktiebolag, Svangsta, Sweden

[21] Appl. No.: 627,921

[22] Filed: Nov. 3, 1975

[30] Foreign Application Priority Data

Nov. 13, 1974  Sweden .......................... 7414234

[51] Int. Cl.² .................... B60T 7/12; A01K 89/02
[52] U.S. Cl. ...................... 188/185; 242/84.52 C
[58] Field of Search .......................... 188/184, 185; 242/84.5 R, 84.52 R, 84.52 C

[56] References Cited

U.S. PATENT DOCUMENTS

| | | | |
|---|---|---|---|
| 462,228 | 11/1891 | Amet | 118/185 |
| 1,904,089 | 4/1933 | Schwerin | 188/185 |
| 2,382,228 | 8/1945 | Howell | 188/185 |

FOREIGN PATENT DOCUMENTS

| | | | |
|---|---|---|---|
| 409,292 | 4/1934 | United Kingdom | 188/185 |

Primary Examiner—Duane A. Reger

[57] ABSTRACT

This invention relates to a centrifugal brake mechanism in a spinning reel for braking a line spool which includes a shaft with a coupling member for coupling the spool to a coupling member in the transmission of the spinning reel, the braking mechanism including a hub member mounted on the shaft with a guide pin holder which supports, on radially directed guide pins, shiftable bodies which are disposed, on rotation of the spool, to be shifted, under the influence of the centrifugal force, radially outwardly on the guide pins to be pressed against a braking surface. According to a preferred embodiment, the hub member with the guide pin holder is supported on the shaft axially inside the coupling member of the shaft, the guide pin holder consisting of at least two guide pin support limbs projecting substantially radially from the hub and having end projections directed axially from the spool, and relatively short guide pins which are supported on the limb projections.

6 Claims, 2 Drawing Figures

CENTRIFUGAL BRAKE MECHANISM

The present invention relates to a centrifugal brake mechanism in a spinning reel for braking a line spool which includes a shaft with a coupling member for coupling the spool to a coupling member in the transmission of the spinning reel, the brake mechanism including a hub member mounted on the shaft with a guide pin holder which supports, on radially directed guide pins, shiftable bodies which are disposed, on rotation of the spool, to be shifted, under the influence of the centrifugal force, radially outwardly on the guide pins to be pressed against a braking surface.

In spinning reels, it is known to use a centrifugal brake mechanism which includes a number of pins projecting radially from a holder mounted on the shaft of the spool and each suppoting a centrifugal weight which is slidable axially on the pin. When the spool is rotated the centrifugal weight is shifted radially outwardly by the centrifugal force into abutment with a circular braking surface against which the centrifugal weights are pressed with a force which is dependent on the rotational speed of the spool.

The major aspect of the present invention is to simplify the means for connecting the guide pin holder of the centrifugal brake to the shaft of the spool. According to the invention, the hub member with the guide pin holder is supported on the shaft axially inside the coupling member of the shaft, and the guide pin holder consists of at least two guide pin support limbs projecting substantially radially from the hub and having end projections directed axially from the spool and relatively short guide pins which are supported on the limb projections.

The nature of the invention and its objects will be more fully understood from the following description of the drawing, and the discussion relating thereto.

Figure 1:
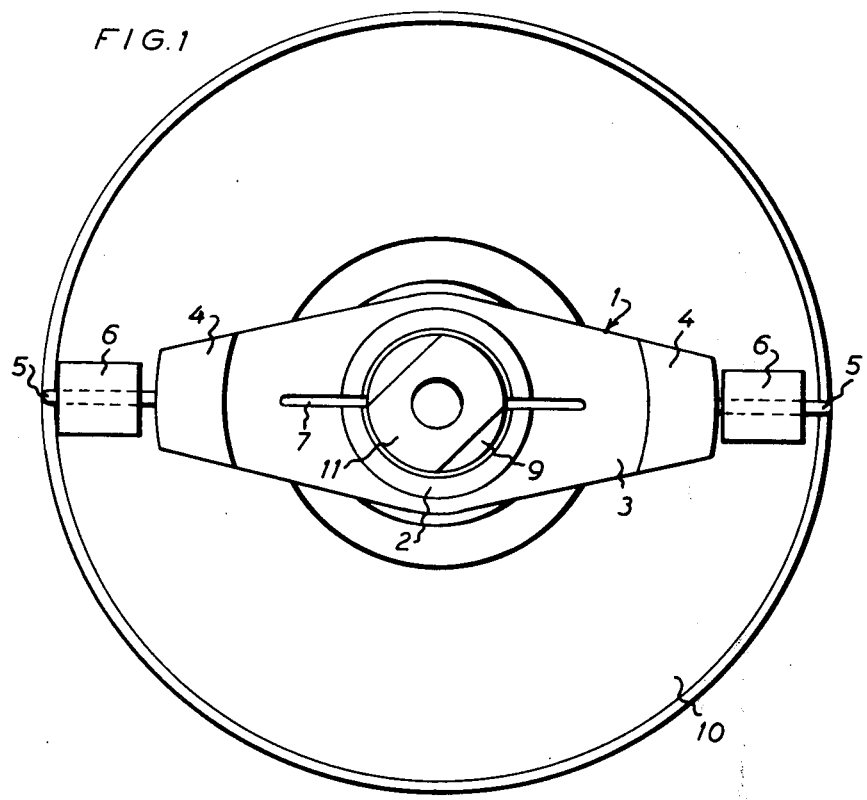
FIG. 1 is an end elevation of a line spool with a centrifugal brake mechanism according to the present invention.

To refer to the drawing, the pin holder 1 is in the form of a yoke consisting of a central hub 2 and two limbs 3 diametrically projecting from the hub. The limbs 3 have, at their outer end portions, axially directed projections 4 in which are fixedly mounted the radially directed guide pins 5 for the centrifugal weights 6.

The yoke 2, 3, is integrally produced from resilient plastic and is provided with a slot 7 which extends through the hub 2 and a distance out into each limb 3. The hole of the hub is dimensioned such that the hub 2, because of the resilience of the material and because of the arrangement of the slot 7, can be pressed into place on the shaft 9 of the spool 8, the yoke being thereafter retained by resilience and friction between the hub 2 and the shaft 9.

The side of the yoke hub 2 facing the end wall 10 of the spool is preferably of a form which is adapted for abutment against the end wall 10. In this position, the pin 5 is supported by the projections 4 of the limbs 3 in the correct axial position relative to a brake drum (not shown) which is supported on a portion connected to the spinning reel.

The centrifugal weights 6 are disposed to be shifted, in a known manner, radially outwardly on the pins 5 when the spool is rotated, the weights being thus moved into abutment with the above-mentioned brake drum.

The guide pin holder 1 according to the invention has the advantage that it is economical to produce and simple to assemble and, if necessary, to dismantle. On assembly, it is only necessary to shift the pin holder into place on the shaft 9 of the spool. The shaft 9 is disposed to be driven, in a known manner, by the crank of the spinning reel by the intermediary of a coupling member (not shown) which can be shifted axially into engagement with a mating coupling member on the shaft 9 of the spool. In order further to simplify the above-described mounting of the pin holder 1 on the shaft 9, the shaft end 11 proper is designed as a coupling member of constant diameter. The shaft end 11 is thus, in the illustrated embodiment, designed with two diametrically located planar surfaces with which the shiftable coupling member (not shown) is brought into engagement on being shifted towards the shaft end 11.

The illustrated embodiment of the coupling member 11 of the shaft 9 provides the double advantage that it is both simple and facilitates assembly and dismantling of the pin holder 1, but other embodiments are also conceivable. If, instead of a coupling member 11 of the illustrated type whose greatest radius is less than the radius of the shaft portion 12 on which the pin holder 1 is to be mounted, use is made of a coupling member with one or more projections, for example, in the form of pins, it is necessary to provide the hub 2 with a recess or slot which permits paassage of the hub past the projection or projections, thus realizing a more complicated construction than that of the illustrated embodiment.

As shown in the drawing, the slot 7 in the hub 2 can, to achieve the desired resilience, extend diametrically throughout the entire hub and out into adjacent portions of the limbs 3 which, in actual fact, form hub projections and permit a shortening of the pins 5. A shortening of the limbs would necessitate lengthening of the pins and the use of a hub 2 without limbs, the pins being directly connected to the hub, would result in the need to provide relatively long pins which, on incautious handling of the spool during overhaul work, can be bent and hinder free movement of the centrifugal weights.

in the preferred embodiment of the pin holder with limbs 3 projecting from the hub 2, these limbs are, for reasons of space, located as close to the end wall 10 of the spool as possible. Consequently, the function of the projections 4 on the limbs is to support the pins 5 with a certain axial outward displacement from the central plane of the hub 2 (or the plane of the limbs 3). The thickness of the limbs adjacent the hub need then not be greater than necessary in view of the strength of the limbs and the resilience of the hub. The correct axial position of the pin holder 1 on the shaft 9, and thereby the correct axial position of the guide pins 5 and the centrifugal weights 6, is obtained by abutment of a surface 13 on the hub 2 against a central annular portion of the outer side of the end wall 10 of the spool.

Figure 2:
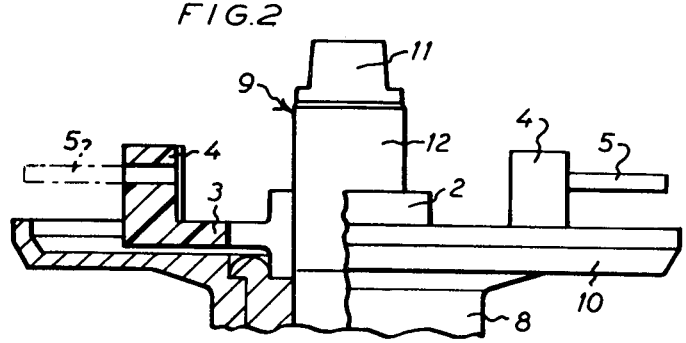
FIG. 2 is a side elevation of the pin holder before being mounted on the shaft of the spool.
Figure 3:
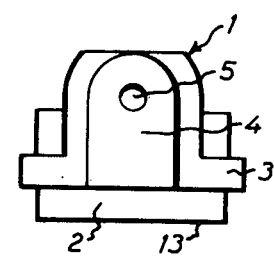
FIG. 3 is an end elevation of the pin holder.

It is apparent from the above that the invention is not restricted to the preferred embodiment shown on the drawing but can be modified in a number of different ways. In the embodiment in FIGS. 1 and 2, the coupling member 11 is arranged to be coupled to a driving coupling member, but it could instead be arranged to be coupled to a mechanism for driving the double-threaded screw of the reel from the shaft of the spool. The guide pins extend out to a radius which substantially corresponds to the radius of the spool end wall 10 but if a larger line spool is used, it can be desirable to arrange the brake drum cooperating with the centrifugal weights/brake blocks 6 inside the circumference of the spool end wall, and the spool end wall can be more curved than is shown, it being then possible for the brake drum also to extend axially inside the outer circumferential edge of the spool end wall after mounting of the spool. It may then be necessary to modify the pin holder 1 by changing the form or length of the limbs 3 or quite simply by fixing the guide pins 5 direct onto an outer position of the hub. These and other intimated modifications fall within the spirit and scope of the appended claims.

What I claim and desire to secure by Letters Patent is:

1. In a reel having a rotating line spool, a centrifugal brake mechanism for braking said spool, a shaft supporting said spool and non-rotatably secured thereto, said shaft having formed thereon a coupling member adapted to be engaged to rotatably drive said shaft and said spool, a hub member mounted on said shaft axially inside said coupling member, said hub member having at least two radially disposed guide pin holders extending radially outwardly from said hub member, at least one relatively short guide pin mounted in said guide pin holders and extending substantially radially thereof and at least one shiftable body slidably mounted about said guide pins whereby said relatively short guide pins are positioned radially outward from said shaft a distance greater than the length of said pins and said shiftable bodies thereon may be moved under the influence of centrifugal force to a position radially displaced from said shaft a distance greater than the length of said relatively short guide pins.

2. The device substantially as described in claim 1 wherein the greatest radius of said coupling member is less than the radius of said shaft at the point axially inside said coupling member on which said hub member is mounted.

3. The mechanism substantially as set forth in claim 1 wherein said hub is formed of resilient material and has formed therein the resilience-increasing diametric slot whereby said hub is retained on said shaft by the reilience of said material.

4. The mechanism substantially as set forth in claim 1 wherein said hub and said radial guide pin holder are integrally formed of resilient material and wherein diametric slot is formed which extends through said hub and into an adjacent portion of said guide pin holder.

5. The mechanism substantially as set forth in claim 1 wherein at least one of said hub and said guide pin holders have a support surface engaging said spool to establish an axial position for said hub and thereby for said guide pins on said shaft.

6. The mechanism as set forth in claim 1 wherein said guide pin holders have formed an axial outwardly directed portion and said guide pins are mounted on said portion.

* * * * *